No. 859,951. PATENTED JULY 16, 1907.
S. D. & H. T. LATTY.
VEHICLE.
APPLICATION FILED NOV. 25, 1905.
2 SHEETS—SHEET 1.
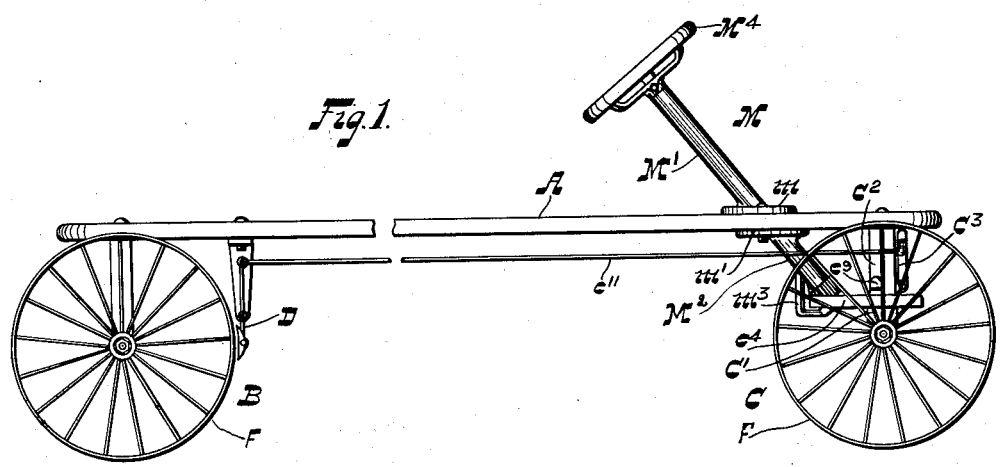
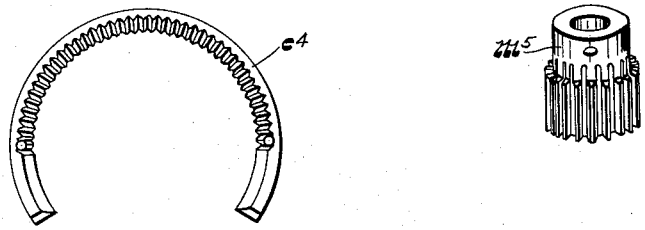
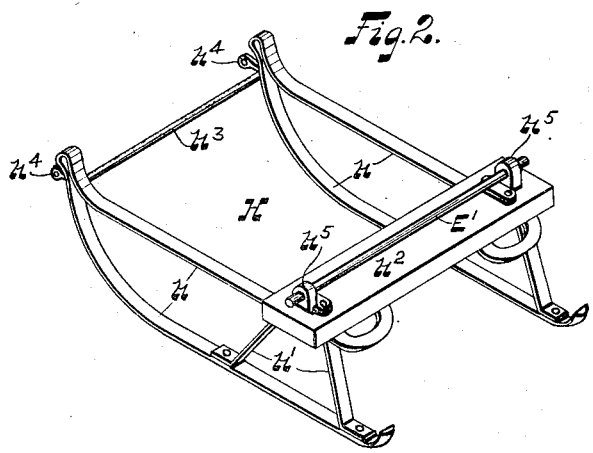
Witnesses:
Edw. Lindmueller.
Jno. F. Oberlin.
Inventors
Samuel D. Latty & Henry T. Latty,
by their attorney,
J. D. Fay No. 859,951. PATENTED JULY 16, 1907.
S. D. & H. T. LATTY.
VEHICLE.
APPLICATION FILED NOV. 25, 1905.
2 SHEETS—SHEET 2.
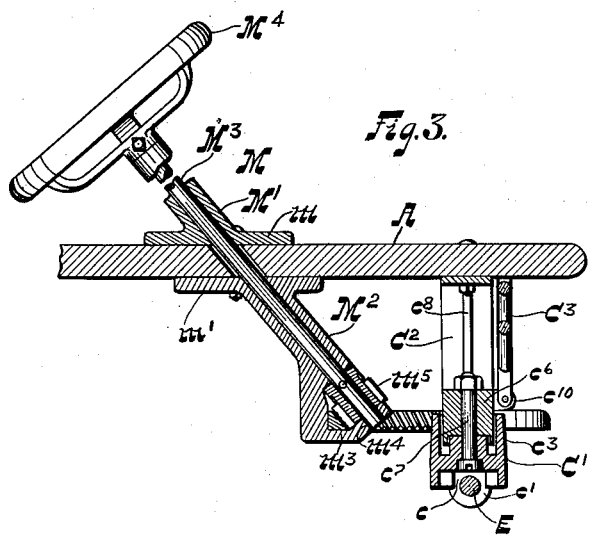
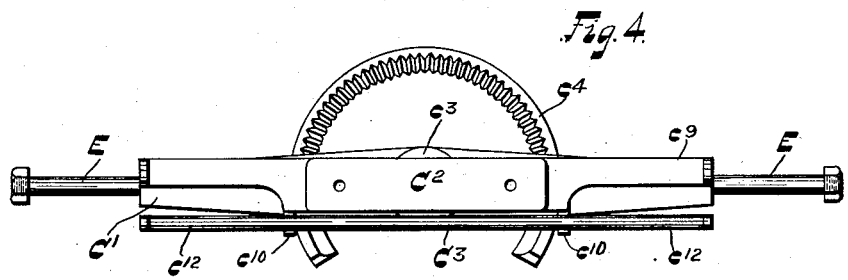
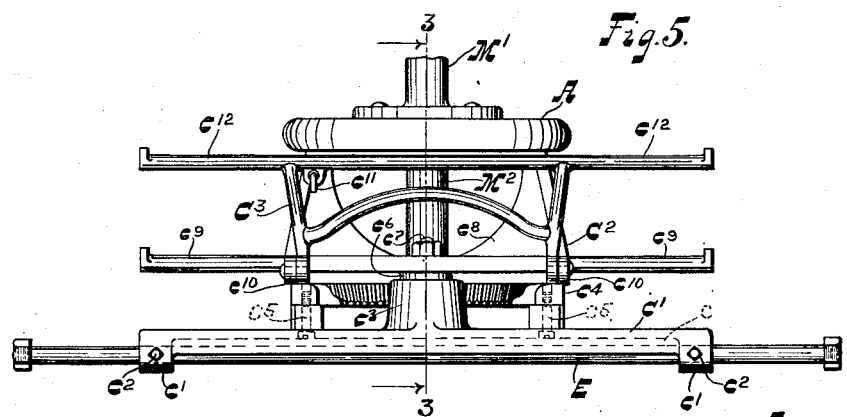
Witnesses:
Edw. Lindmueller.
Jno. F. Oberlin.
Inventors
Samuel D. Latty & Henry T. Latty,
by their attorney,
J. B. Fay

UNITED STATES PATENT OFFICE.

SAMUEL D. LATTY AND HENRY T. LATTY, OF CLEVELAND, OHIO.

VEHICLE.

No. 859,951.  Specification of Letters Patent.  Patented July 16, 1907.

Application filed November 25, 1905. Serial No. 289,013.

*To all whom it may concern:*

Be it known that we, SAMUEL D. LATTY and HENRY T. LATTY, citizens of the United States, and residents of Cleveland, county of Cuyahoga, and State of Ohio, have invented a new and useful Improvement in Vehicles, of which the following is a specification, the principle of the invention being herein explained and the best mode in which we have contemplated applying the principle, so as to distinguish it from other inventions.

Our invention relates to improvements in vehicles, especially in children's pedaled or automobile vehicles, and in coasters, that is in wagons and sleds designed for coasting down hill; and it has particular reference to the construction of the forward running gear and to the steering mechanism of such vehicle. This running gear construction and steering mechanism are not, however, limited in their application to the particular class of vehicles above described, nor to the still more specific type, that of a coaster, chosen for the purpose of this description. In this type, in addition to the elements of strength and simplicity of structure presented thereby, such running gear is adapted to be readily converted from the wheeled to the sled form, and vice versa, in which latter it embodies the familiar features of a "double runner" sled while still retaining the perfect dirigibility made possible by our steering mechanism. Along with the foregoing, our invention includes simple and compact brake-operating means designed to conform with the front axle structure, and to be actuated by foot pressure.

Said invention consists of means hereinafter fully described and particularly set forth in the claims.

The annexed drawings and the following description set forth in detail certain mechanism embodying the invention, such disclosed means constituting but one of various mechanical forms in which the principle of the invention may be used.

In said annexed drawings: Figure 1 represents a side elevation of a coaster in wagon form embodying our improvement. Fig. 2 represents one of the sleds designed to replace the front and rear wheels respectively, of such wagon form in converting the same into a double runner sled. Fig. 3 is a transverse vertical cross-section of the forward running gear and the steering mechanism. Figs. 4 and 5 are respectively a plan view and a front elevation of the same. Fig. 6 represents a circular rack forming a part of such steering mechanism, while Fig. 7 shows, in enlarged view, a pinion which meshes therewith.

As has been stated, the particular type of vehicle in which we have chosen to embody our improvement for the purposes of illustration is a coaster. Such coaster essentially comprises, Fig. 1, a coaster body A, mounted upon front and rear running gear C and B. The form of the body A is immaterial, although for the particular purpose for which the device is primarily designed a long stout board is usually employed as shown. Likewise the structure of the rear portion of the running gear may be of any approved form, provided it be adapted to allow the substitution of sled runners for wheels and vice versa. The brake D, intended to be applied to the rear wheels, is shown in merely conventional form, it being understood here also that when the coaster is used as a sled a suitable form of brake may be substituted therefor.

As has been indicated, it is to the construction of the forward running gear, with the steering mechanism therein involved, that our invention more particularly relates. This construction is fully shown in Figs. 3, 4, and 5. As is there revealed the base of such gear is a truss member $C'$, which has a longitudinal groove $c$ on its under side and lugs $c'$ at either end, provided with apertures registering with groove $c$ and adapted to receive a spindle E. Set screws $c^2$ in lugs $c'$ serve to secure such spindle against rotation as well as against lateral displacement.

Either wheels F, as shown in Fig. 1, or the sled member H shown in Fig. 2, may be optionally mounted upon this spindle as will be more fully explained in connection with the description of such sled member later. Such truss member together with spindle E, it is thus seen, forms in effect the front axle of the coaster.

On its upper surface and equidistant of its ends, truss member $C'$ is provided with an upwardly projecting hollow boss $c^3$ and with an annular segment $c^4$ extending rearwardly and in a horizontal plane. While this annular segment is for convenience made separate from truss member $C'$, Fig. 6, it is rigidly attached to the latter by means of screws or bolts $c^5$ and may be made integral therewith. This annular member is provided with a bevel rack on its inner side, such rack extending from approximately the point of attachment on one side to that on the other. While shown with ends extending only a short distance beyond such points of attachment, this rack-bearing segment might be made as an entire circle if desired, inasmuch as, in addition to serving as a turning member, one of its functions is to support the bolster of the coaster which rests slidingly upon it and so necessitates the extension of the forward ends of the segment a sufficient distance to prevent such bolster's becoming disengaged therefrom. Such bolster, designated as $C^2$, is preferably a casting of trapezoidal shape as shown, with one parallel side resting upon the annular segment $c^4$ in the manner just indicated, while upon the other rests and is secured the coaster body A. Bolster $C^2$ is further provided on its lower side with a downwardly projecting stud $c^6$ adapted to register in the hollow boss $c^3$ upon truss member $C'$ whereby it is seen that bolster and truss are pivotally connected together, a king bolt $c^5$ serving to prevent their accidental separation. To strengthen the bolster $C^2$ against all lateral strains it is formed with a web $c^8$ in its lower corners.

Upon the coaster body, and to the rear of its point of attachment to bolster $C^2$, is mounted a hollow steering post M inclined rearwardly, although that is a matter of convenience, at an angle substantially that indicated in Figs. 1 and 3. Such steering post comprises an upper member M' and a lower member $M^2$ respectively attached to the top and bottom surfaces of the coaster body by means of integral flanges $m$ and $m'$ as will be readily understood. The lower end of member $M^2$ is formed on its under side with an angular recurved portion $m^3$ within which the annular segment $c^4$ slidably rests and near the extremity of which is a bore $m^4$ in alinement with the bore of the steering post proper. The steering shaft $M^3$ is rotatably mounted in such steering post, being of such a length that when steering wheel $M^4$, which is attached to its upper end, rests on upper post member M', its lower end will extend into the bore $m^4$ in the recurved extremity of lower member $M^2$.

Keyed upon steering shaft $M^3$, and lying between the end of such lower post member $M^2$ and its recurved extremity $m^3$, is a pinion $m^5$ which meshes with the bevel rack on segment $c^4$. It is hence readily seen that a rotation of steering wheel $M^4$ will move the segment $c^4$ through the extremity $m^3$ of the post and thereby effect the turning of the front axle to which such segment is affixed. By providing a rack on segment $c^4$ for the proper distance only, accidental locking of the front wheels against the body of the coaster is made impossible, since the front axle cannot be turned at any sharper angle than that here provided for. It will also be noted that when pinion $m^5$ is in place, segment $c^4$, which has been described as slidably resting in the lower recurved end portion of the steering post, is further secured against displacement therefrom, and the front axle thus held from tilting. This construction, while involving no additional parts, relieves the king-bolt of all undue strain and greatly strengthens the whole forward gear of the coaster.

The bolster $C^2$ is further provided with integral, laterally extending foot-rests $c^9$ for the steersman; also with a frame $C^3$ pivotally attached to lugs $c^{10}$ on the front of such bolster so as to swing on a horizontal axis transversely of the coaster body. A rod $c^{11}$ serves to connect this frame with the brake D so that a forward swing of the frame serves to apply such brake. The frame is adapted to be thus actuated by the pressure of the steersman's feet upon lateral projections $c^{12}$ which are similar to foot-rests $c^9$ and, in the normal position of the brake and frame, lie substantially above the same.

For use with our coaster when employed as a double-runner sled we have devised the sled member H, already alluded to, and shown in Fig. 2. Each of the runners $h$ of this sled member are fashioned out of a continuous piece of "half over" bar stock, curved and bent upon itself in the manner clearly illustrated in the figure named. The free end of the upper portion of the runner is supported upon the lower portion, or runner proper, by an arched brace or strut $h'$ and is bent inwardly in a horizontal plane to form an additional point of attachment for a cross bar $h^2$ by which the runners are connected. Additional lateral stability is secured by joining the forward ends of the runners by a rod $h^3$ in connection with which suitable eyes $h^4$ are provided for attaching a cord which in the case of the forward sled would be used to pull the coaster, and in case of the rear sled to attach the same to the coaster body to prevent its turning crosswise. On the top of rear cross bar $h^2$, which is preferably of wood, are secured two upwardly projecting lugs $h^5$ in which are formed bearings adapted to receive spindle E of the front running gear of the coaster. These lugs $h^5$ being positioned to just fit without lugs $c'$ on truss member $C'$, it is apparent that by loosening set screws $c^2$, having first removed the wheels, drawing out spindle E, and then reinserting it so as to engage successively lugs $c'$ and $h^5$, sled member will be firmly secured to the coaster, being, however, at the same time free to oscillate upon spindle E.

In practice a shorter spindle E', Fig. 2, is by preference employed, since the portions of spindle E upon which the wheels turn would extend beyond the sled and hence be in the way. The structure of the rear portion of the running gear, as has been stated, may be of any approved form; this should be qualified by stipulating that the spindle be mounted in a fashion similar to that of spindle E so as to permit the ready substitution of a sled member H for the rear wheels as has just been described in connection with the front wheels.

It is thus seen that our improved coaster is readily adapted for use either as a sled or a wheeled vehicle, such convertibility being obtained with the employment of practically no additional parts aside from the sled runner. In either form the same running gear and steering mechanism is employed. In addition effective brake-operating means are provided in position to be immediately actuated without interfering with the steering of the coaster since the feet are not employed for the latter purpose as is usual in coasters. The simplicity and strength of the forward running gear structure well adapts such structure for use in any vehicle, while the steering mechanism is just as efficient and easy of operation when embodied in an automobile as in a coaster.

Having thus described our invention in detail, that which we particularly point out and distinctly claim is:

1. In a vehicle, the combination of a truck; a horizontally disposed rack-bearing segment attached thereto; a vehicle body pivotally mounted upon said truck; a steering post mounted upon said body and having its lower end formed and disposed to slidably engage said segment; and a steering shaft in said post, bearing a pinion adapted to engage the rack on said segment.

2. In a vehicle, the combination of a truck provided with a horizontally disposed rack-bearing annular segment; a vehicle body pivotally mounted upon said truck, a steering post mounted on said body and having a recurved portion at its lower end adapted to slidably engage said segment and to secure the same against vertical displacement; and a steering shaft in said post bearing a pinion adapted to engage the rack on said segment.

3. In a vehicle, the combination of a truss member; a spindle detachably mounted therein; an annular rack-bearing segment attached thereto and rearwardly extending therefrom; a bolster pivotally mounted upon said truss member and slidably resting upon said segment; a vehicle body mounted upon said bolster; and a steering shaft mounted in said body and bearing a pinion adapted to engage the rack on said segment.

4. In a vehicle, the combination of a truss member; a spindle detachably mounted therein; an annular rack-bearing segment attached thereto and rearwardly extending therefrom; a bolster pivotally mounted upon said truss member, and slidably resting upon said segment; a vehicle body mounted upon said bolster; a steering post mounted on said body, the lower end of said post being adapted to slidably engage said segment; and a steering shaft in said post bearing a pinion adapted to engage said segment.

5. In a vehicle, the combination of a truck; a horizontally disposed annular rack-bearing segment attached thereto; a vehicle body pivotally mounted upon said truck; a steering shaft; a steering post therefor mounted upon said body and having its lower end formed with a recurved portion adapted to slidably engage said annular segment and having a bearing adapted to receive the lower end of said shaft; and a pinion rotatively mounted upon said steering shaft, said pinion being retained thereby in the recurved portion of said post in mesh with the rack on said segment.

Signed by us, this 13" day of November 1905.

SAMUEL D. LATTY.
HENRY T. LATTY.

Attested by:
JNO. F. OBERLIN,
G. W. SAYWELL.